United States Patent
Yonaha

(10) Patent No.: US 7,450,739 B2
(45) Date of Patent: Nov. 11, 2008

(54) IMAGE PROCESSING APPARATUS AND METHOD, RED-EYE DETECTION METHOD, AS WELL AS PROGRAMS FOR EXECUTING THE IMAGE PROCESSING METHOD AND THE RED-EYE DETECTION METHOD

(75) Inventor: Makoto Yonaha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 785 days.

(21) Appl. No.: 10/942,811

(22) Filed: Sep. 17, 2004

(65) Prior Publication Data

US 2005/0074164 A1    Apr. 7, 2005

(30) Foreign Application Priority Data

Sep. 19, 2003   (JP)   ............... 2003-328545

(51) Int. Cl.
*G06K 9/00* (2006.01)

(52) U.S. Cl. .................. 382/118; 382/218; 382/291

(58) Field of Classification Search ......... 382/117–118, 382/162, 167, 181, 190, 203, 274, 275, 151, 382/209, 218, 291; 348/216, 251, 576; 351/207
See application file for complete search history.

(56) References Cited

U.S. PATENT DOCUMENTS

| | | | | |
|---|---|---|---|---|
| 5,990,973 A | * | 11/1999 | Sakamoto | ........ 348/576 |
| 6,980,691 B2 | * | 12/2005 | Nesterov et al. | ........ 382/165 |
| 7,062,086 B2 | * | 6/2006 | Chen et al. | ........ 382/165 |
| 2003/0021478 A1 | | 1/2003 | Yoshida | |
| 2003/0044070 A1 | * | 3/2003 | Fuersich et al. | ........ 382/190 |
| 2003/0044177 A1 | * | 3/2003 | Oberhardt et al. | ........ 396/158 |
| 2004/0233299 A1 | * | 11/2004 | Ioffe et al. | ........ 348/239 |
| 2005/0047656 A1 | * | 3/2005 | Luo et al. | ........ 382/167 |

FOREIGN PATENT DOCUMENTS

| | | |
|---|---|---|
| JP | 2002-247596 A | 8/2002 |
| JP | 2003-36438 A | 2/2003 |

* cited by examiner

*Primary Examiner*—Daniel G Mariam
(74) *Attorney, Agent, or Firm*—Sughrue Mion, PLLC

(57) ABSTRACT

An image processing apparatus which processes an input image to detect a specified object of interest that is recorded in the input image is provided. The apparatus has a detection unit and a position determining unit. The detection unit has a plurality of identifying subunits each of which identifies an object from the input image under a different condition. The detection unit detects a region of the identified object. The position determining unit calculates the position coordinates of the object of interest in the input image from the region of the identified object. The detection unit performs the identification and the detection repeatedly and the detection unit performs the identification and the detection by using a detected region of an identified object in the previous identification. The detection unit detects the specified object of interest using the repeatedly detected regions.

14 Claims, 3 Drawing Sheets

IMAGE PROCESSING APPARATUS AND METHOD, RED-EYE DETECTION METHOD, AS WELL AS PROGRAMS FOR EXECUTING THE IMAGE PROCESSING METHOD AND THE RED-EYE DETECTION METHOD

BACKGROUND OF THE INVENTION

This invention relates to an image processing apparatus and method that can detect (recognize) an object of interest within image, as exemplified by detecting a red-eye (an eye with the red-eye effect) from a photographic image, as well as a red-eye detection method for detecting a red-eye from within an image and programs for executing the image processing method and the red-eye detection method.

The digital photoprinter has been recently commercialized as an apparatus that makes photoelectric reading of an image recorded on a film, converts the image to digital signal, performs various image processing steps on the digital signal to create image data for recording purposes, exposing a photographic material to recording light modulated in accordance with the image data, and outputs the original image as print.

In the digital photoprinter, the image recorded on a film is read photoelectrically and, after the image is converted to digital image data, various image processing schemes and exposing of the photographic material are performed. Hence, print can be created not only from the image recorded on a film but also from the image (image data) recorded with a digital camera and the like.

With the recent growth in the use of personal computers (PCs) and digital cameras, as well as inexpensive color printers such as the ink-jet printer, it has become commonplace for many users to take a picture with their digital camera, download it into their PC, perform image processing and output the finished image from a printer.

More recently, there has been commercialized a newer type of printer that makes direct reading of image data from storage media such as SMART MEDIA™ and COMPACT™ flash storing the image taken with a digital camera and which performs specified image processing steps, as well as outputting a print (hard copy) that carries the finished image.

Speaking of portraits and other pictures showing a human subject, one of the most important elements that affect the image quality is how the human subject finally comes out in the image. Therefore, the red-eye effect, or a human subject's eye (pupil) appearing red due to the burst of an electronic flash used to take the picture, is a critical problem.

With the conventional photoprinter which performs direct exposure on film, red-eye correction is a very difficult task to deal with. However, in the case of digital image processing as is performed by the digital photoprinter, red-eye correction can be effected by first detecting the red-eye through image processing (image analysis) and transforming the image data for the red-eye region, as well as performing color/density correction on the transformed image data. Hence, various methods have been proposed for detecting the red-eye within an image by means of image processing.

For example, JP 2002-247596A discloses a method in which on the basis of image characteristic quantities for a region of interest including the eye region of an image, characteristic regions including the iris region are detected from the region of interest and the red-eye region or regions are specified using the positional relationship between the iris region and another characteristic region, as exemplified by the degree of contact between the iris region and another characteristic region, the area ratio between the region of interest and the red-eye region, and as to whether the iris region includes another region (e.g. the pupil region) or not.

As another example, JP 2003-36438A discloses a method in which on the basis of image characteristic quantities for a region of interest including the eye region of an image, a plurality of characteristic regions including the iris region (possible region for the red-eye region) are detected from the region of interest using its color hue, saturation and lightness, and the red-eye region is specified on the basis of contact or non-contact between the iris region and another characteristic region, the gradation characteristics of the image characteristic quantities for the characteristic regions and the area information for the characteristic regions.

The red-eye effect is a phenomenon peculiar to human subjects, animals and other natural subjects. Here the images (image data) of human subjects, animals and other natural subjects change greatly with various kinds of conditions. In other words, the image processing of natural subjects involves great changes in the subject's size, brightness/density, distortion and other parameters of the processing depending upon various kinds of conditions.

For instance, the size of the subject within the image varies greatly with the shooting distance. In addition, depending on the exposure to sunshine which varies with weather or locality, the color, density or brightness of a part of the subject such as face will vary.

The conventional methods (algorithms) for red-eye detection, including those disclosed in JP 2002-247596A and Jp 2003-36438A, can detect red-eye in a satisfactory way under particular conditions.

However, as mentioned above, the parameters to image processing of natural subjects vary considerably depending on case. Given such varying parameters, it is impossible to perform red-eye detection in an appropriate way by the prior art.

SUMMARY OF THE INVENTION

The present invention has been accomplished under these circumstances and has as a goal providing an image processing method that is applicable to natural subjects of the image such as human subjects under varying conditions and which can detect red-eye and other objects of interest from within an image.

Another goal of the invention is to provide an apparatus for implementing the method.

Still another goal of the invention is to provide a red-eye detection method that is capable of rapid red-eye detection from within an image.

A further goal of the invention is to provide programs for executing the image processing method and the red-eye detection method.

The present invention provides an image processing apparatus which processes an input image to detect a specified object of interest that is recorded in the input image. The apparatus comprises: a detection unit having a plurality of identifying subunits each of which identifies an object from the input image that satisfies a condition which is set differently each other, the detection unit detecting a region of the identified object; and a position determining unit which calculates the position coordinates of the object of interest in the input image from the region of the identified object, wherein the detection unit performs the identification and the detection repeatedly and, when the identification and the detection are repeated, the detection unit performs the identification and the detection under a different condition for identification than that used in previous identification of repeated identifications by using a detected region of an identified object in the previous identification, and the detection unit detects the specified object of interest using the repeatedly detected objects.

In the image processing apparatus the detection unit has preferably an identifying subunit that detects a resemblance to the object of interest as an object that is to be detected erroneously as the object of interest, and wherein a region of the detected resemblance is excluded from a region of the object of interest.

More preferably, the input image is an image recorded with an image pickup device and the object of interest is an eye with the red-eye effect of a human subject or an animal.

Alternatively, the input image is preferably an image recorded with an image pickup device, the object of interest is preferably an eye with the red-eye effect of a human subject, and the identifying subunit for detecting the resemblance as an object is at least one member of the group consisting of an identifying subunit which detects spectacles worn by a human subject as the resemblance, an identifying subunit which detects the crow's foot on the face as the resemblance, an identifying subunit which detects the eyebrow on the face as the resemblance, and an identifying subunit which detects a pimple on the face as the resemblance.

Preferably, the identification of an object by the detection unit is such that the region of the object detected is narrowed down as the identification is repeated.

The present invention provides an image processing method which processes an input image to detect a specified object of interest that is recorded on the input image. The method comprises the steps of: identifying an object from the input image that satisfy a condition; detecting a region of the identified object; repeating the step of identification and the step of detection a plurality of times with the condition being varied, thereby identifying and detecting an object each time under a different condition for than that used in previous identification of repeated identifications by using a detected region of an identified object in the previous identification; and detecting a region of the specified object of interest within the input image on a basis of repeatedly detected regions of the identified objects and calculating the position coordinates of the object of interest in the input image from the detected region of the object of interest.

The present invention also provides a red-eye detection method by which an input image that records a human subject or an animal is processed for detecting an eye with the red-eye effect of the human subject or the animal that is recorded in the input image. The method comprises the steps of: detecting from the input image a possible region for red-eye that may have developed the red-eye effect; detecting a region of a face of the human subject or the animal from the input image after detecting the possible region for red-eye; and detecting the region of the eye with the red-eye effect from the input image by collating the results of detecting the possible region for red-eye and the face region.

In the a red-eye detection method, at least one object selected from the group consisting of spectacles worn by a human subject, a crow's foot on the human subject's face, an eyebrow on the human subject's face and a pimple on the human subject's face is detected from the input image and the region of the eye with the red-eye effect is preferably detected from the input image using the result of detection of at least one member of the group.

The present invention also provides an executable program which causes a computer to perform image processing of an input image for detecting a specified object of interest that is recorded in the input image. The program comprises the steps of: causing an operating unit in the computer to identify an object that satisfies a condition from within the input image; causing the operating unit to detect a region of the identified object and storing it in a memory; repeating the step of the identification and the step of the detection with the condition being varied, thereby causing the operating unit to perform a plurality of identification and detection such that a detected region of an identified object in previous identification of repeated identifications is used to get the operating unit to perform identification and detection under a different condition for identification than that used in the previous identification; and causing the operating unit to detect a region of the object of interest within the input image on a basis of the regions of the repeatedly detected objects and causing the operating unit to calculate the position coordinates of the object of interest in the input image from the detected region of the object of interest.

The present invention also provides an executable program that causes a computer to perform red-eye detection such that an input image that records a human subject or an animal is processed for detecting an eye with the red-eye effect of the human subject or animal that is recorded in the input image. The program comprises the steps of: causing an operating unit in the computer to detect from the input image a possible region for red-eye that may have developed the red-eye effect; causing the operating unit to function such that, after detecting the possible region for red-eye, the operating unit detects a region of a face of the human subject or animal from the input image using the result of detecting the possible region for red-eye; and causing the operating unit to detect a region of the eye with the red-eye effect from the input image by collating results of the detections of the possible region for red-eye and the face region.

Preferably, the program further includes at least one step selected from the group consisting of the step of causing the operating unit to function such that the spectacles worn by the human subject is detected from the input image as an object, the step of causing the operating unit to function such that a crow's foot on the human subject's face is detected from the input image as an object, the step of causing the operating unit to function such that the eyebrow on the human subject's face is detected from the input image as an object, and the step of causing the operating unit to function such that a pimple on the human subject's face is detected from the input image as an object, and wherein the step by which the region of the eye with the red-eye effect is detected from the input image is assigned to the operating unit such that the operating unit detects the region of the eye with the red-eye effect using the result of at least one detecting step of the group which is followed by the step detecting the region of the eye with the red-eye effect.

Having the above-described features, the present invention can appropriately detect an object of interest, such as red-eye, from an image no matter how varied it is in terms of its conditions such as the subject's size, brightness/density and the amount of distortion. In addition, according to the red-eye detection method of the invention, red-eye can be detected from an image in a more efficient and faster way.

This application claims priority on Japanese patent application No. 2003-328545, the entire contents of which are hereby incorporated by reference.

BEST MODES FOR CARRYING OUT THE INVENTION

On the pages that follow, the image processing apparatus and method, red-eye detection method and programs for implementing the image processing and red-eye detection methods according to the invention are described in detail with reference to the preferred embodiments shown in the accompanying drawings.

Figure 1:
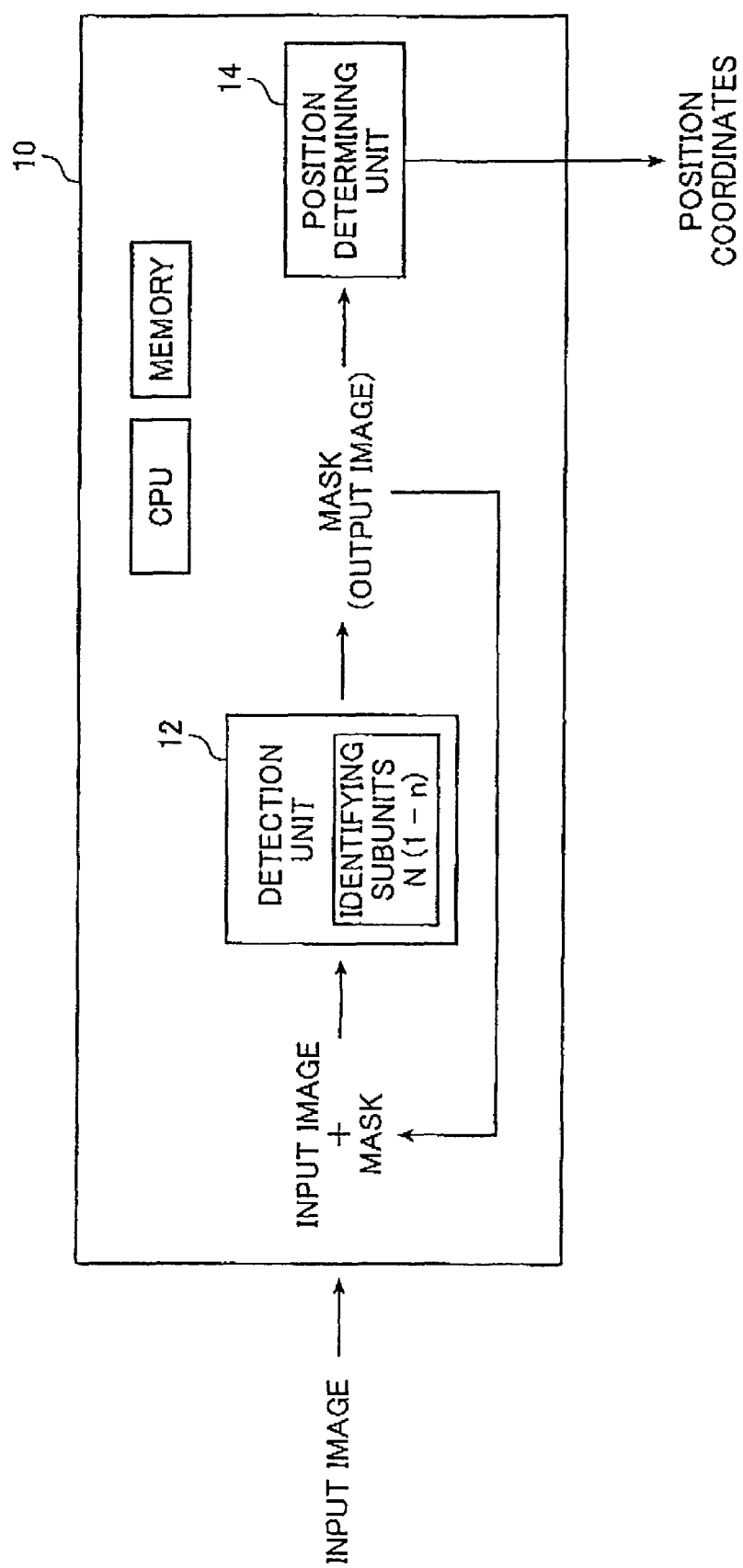
FIG. 1 is a block diagram showing an example of the image processing apparatus of the invention.

FIG. 1 is a block diagram showing an example of the image processing apparatus of the invention for implementing the image processing method of the invention.

The image processing apparatus generally indicated by 10 in FIG. 1 detects a red-eye region from an input image (input image data) and outputs the position coordinates (position coordinate data) of the red-eye in the image. The apparatus consists basically of a detection unit 12 and a position determining unit 14. Such image processing apparatus 10 may be implemented using computers such as personal computer and work station, or DSPs (digital signal processors).

The input image to the illustrated image processing apparatus 10 (hereunder referred to as the processor 10) may be a color photographic image (data), which may be taken with a conventional camera using photographic film (ie., as obtained by photoelectric reading of photographic film) or with a digital camera.

The input image is supplied to the detection unit 12.

The detection unit 12 processes the input image to detect (extract) the region of the object of interest from within the input image and it supplies the position determining unit 14 with the region of the object of interest (a mask image to be described later) in the input image. Depending on the need, the detection unit 12 may enlarge/reduce the input image or rotate it to generate various processing images, process the obtained processing images as described later and coordinate the results of the processing, thereby detecting the red-eye (the eye with the red-eye effect) from the input image obtained by recording a human subject.

In the processor 10, the detection unit 12 has a plurality of identifying subunits by means of which different objects that satisfy mutually different conditions are identified from the input image. The plurality of identifying subunits N (N is a natural number of 1–n) sequentially identify the objects, detect the regions of the identified objects (this step is hereunder referred to as "processing") and calculates the region of the object of interest from the input image in accordance with the results of the processing.

In the present invention, the identifying subunits N may employ any known object identifying algorithms that identify an object from within an image by various processes such as detecting the color/density of the image, edge detection, confirming the continuity of the image, shape recognition and pattern recognition and which further perform identification using lexical data (reference data) that is obtained by learning from a group of images associated with the object to be detected.

In the illustrated case, the detection unit 12 having the identifying subunits N outputs a mask image as the result of the processing (output image) that shows the region of the object within the input image (an exemplary mask image is one that shows the region of the object by "1" and the other region by "0"). If necessary, the identifying subunits N may further perform processing using the mask image (hereunder referred to simply as the "mask") outputted from the identifying subunit N that performed earlier processing.

To give an example, the detection unit 12 first processes the input image with the identifying subunit 1 to generate a mask 1 that shows the region of the object in the identifying subunit 1. Subsequently, the region of the object in the mask 1 of the input image is processed using the identifying subunit 2 to generate a mask 2 that shows the region of the object in the identifying subunit 2. Then, the region of the object in the mask 2 of the input image is processed using the identifying subunit 3 to generate a mask 3 that shows the region of the object in the identifying subunit 3, . . . , and finally, the region of the object in the mask n−1 of the input image is processed using the identifying subunit n to generate a mask n that shows the region of the object in the identifying subunit n, with the mask n being used as the result of detecting the object of interest.

Note that the identifying subunit 1 as it first processes the input image may optionally use a mask if this is necessary. For example, if the input image is an identifying photo and the final object of interest is red-eye, detection may be performed using a mask image that processes only the central area of the image. This contributes to offering such advantages as shortening the processing time.

Whether a mask should be used in the identifying subunit 1 or which mask should be used may be determined by the operator's choice/command using GUI (graphical user interface) and the like. Alternatively, in AUTO setting mode the mask may be determined using image analysis and the like.

As already mentioned for the illustrated case, the detection unit 12 in the processor 10 detects the red-eye region (which means the object of interest is red-eye). To this end, the detection unit 12 may have three identifying subunits, subunit 1 for identifying the face from the input image, subunit 2 for identifying the eye from the input image, and subunit 3 for identifying red-eye from the input image. On the basis of the face as identified by subunit 1, the detection unit 12 constructs mask 1 which shows the face region in the input image by "1" and the other region by "0"; on the basis of the eye as identified by subunit 2, the detection unit 12 constructs mask 2 which shows the eye region in the input image by "1" and the other region by "0". In addition, on the basis of the red-eye as identified by subunit 3, the detection unit 12 constructs mask 3 which shows the red-eye region in the input image by "1" and the other region by "0".

The detection unit 12 first detects the face from the input image in the identifying subunit 1 so as to construct mask 1 which defines the face region; subsequently, using the mask 1, the identifying subunit 2 identifies the eye in the face region of the input image and on the basis of the result of this identification, the detection unit 12 constructs mask 2 which defines the eye region; in addition, using the mask 2, the identifying subunit 3 identifies the red-eye in the eye region of the input image and on the basis of the result of this identification, the detection unit 12 detects the red-eye region to construct mask 3; the mask 3 is supplied to the position determining unit 14 as the result of red-eye detection.

In the foregoing example, the region of the object is represented by "1" and the other region by "0". However, the mask (showing the result of detecting the object) may be represented by intermediate values rather than by the binary data.

For example, in subunit 1 which is to identify the face, the mask 1 may be constructed in two bits such that "3" is assigned to the region that can be identified as the face with 100% assurance, "2" to the region that can be identified as the face but not with 100% assurance, "1" to the region that can be identified as not being the face although not with 100% assurance, and "0" to the region that can be identified as not being the face with 100% assurance, and these results may be combined with the result of eye identification that is subsequently performed in the identifying subunit 2, thereby achieving higher precision and the like.

It should also be noted that in the present invention, the result of detecting the region of an object on the basis of its identification (ie., representation of the detected region) is not limited to the mask image (output image) of the type described in the illustrated case and various other techniques may be employed. For example, the result of detecting the object may be represented by the list of "data 1" (list of coordinate positions) rather than by the mask image.

As described above, the present invention employs a plurality of identifying subunits that detect mutually different objects and, optionally utilizing the results of detection by the identifying subunits that performed earlier processing, the plurality of identifying subunits repetitively detect the objects, thereby assuring that the invention can appropriately detect an object of interest, such as red-eye, from an image no matter how varied it is in terms of its conditions such as the subject's size, brightness/density, and the amount of distortion.

In a preferred embodiment of the invention, the detection unit 12 may further include identifying subunits that detect objects that are different from but similar to the object of interest such as red-eye (the similar objects are hereunder sometimes referred to as "resemblances") and the results of detection by such identifying subunits that detect resemblances may additionally be utilized to accomplish detection of the final object of interest. This contributes to further improvement in the precision and reliability of detection of the object of interest.

Referring to the illustrated case, the processor 10 is designed to detect the red-eye in the input image and it preferably includes at least one of the identifying subunits that identify objects prone to be erroneously detected as red-eye, for example, spectacles put on the face, the crow's foot, the eyebrow and a pimple. In this case, the subunits for identifying the respective resemblances may be combined with the detection unit to construct a mask that shows the region of the identified object (ie., the resemblance of red-eye); the constructed mask (which is hereunder referred to as a "similar mask" for convenience sake) and the red-eye region shown by the aforementioned mask 3 representing the red-eye region are collated and the region that coincides between the two masks, being held as not representing the red-eye, is excluded from the red-eye region of the mask 3, whereby the result of detecting the red-eye region is provided. Alternatively, prior to the construction of the mask 3, similar masks are constructed by the subunits for identifying the respective resemblances and the regions represented by the similar masks are excluded, followed by detection with the identifying subunit 3 to construct the mask 3 which represents the result of detection of the red-eye region.

In a further embodiment of the invention, a group of images (a group of tutorial images) may be provided for the object of interest to be detected such that they are referenced to choose the identifying subunits N that are to perform processing in the detection unit 12, determine the order of processing by such identifying subunits N and perform other functions, thereby ensuring optimization of the processing time and the detecting performance.

To give an example, a subunit for identifying the face, a subunit for identifying the eye and a subunit for identifying the pupil may be complemented with a plurality of images, or a group of tutorial images, that include the face and in which the exact positions of the face, the two eyes and the pupil are known. Note that the positions of the face, the eyes and the pupil in the tutorial images may be verified visually by an operator and entered preliminarily as data for the correct answer.

The group of tutorial images may be subjected to identification by the above-described identifying subunits, for example, to face identification by the identifying subunit 1 and the result is compared with the data for the correct answer preliminarily entered, thereby allowing for automatic determination as to whether the identification is successful or not. In addition, the difference between the result of identification by an identifying subunit and the data for the correct answer (ie., the error in the identification by that identifying subunit) may be taken with a view to performing automatic evaluation of precision. As a further advantage, the processing time can be measured. In short, by employing the group of tutorial images, there is obtained such an advantage that if identification of the face is to be effected by two identifying subunits A and B and so on, the performance of one identifying subunit can be automatically compared with the performance of other subunit.

Thus, in one application of this technique, the identifying subunits N may be provided in such an order that the first subunit has the least possibility of wrong identification to assure utmost safety whereas it takes the longest processing time and a certain identifying subunit in the detection unit 12 may be skipped (bypassed), changed for another in the order of use or otherwise modified as appropriate for performing identification and detection using the group of tutorial images, whereby an optimum procedure for processing can be determined automatically in view of such factors as the results of detection, the required processing time and detection performance, etc.

In another application of the approach under consideration, identification and detection may be performed in a sequence of stages, such as from face identification and detection through eye identification and detection to pupil identification and detection, in order to detect the final object of interest, and even in this case, performance evaluation can be performed with a view to choosing an optimum procedure, identifying subunit, etc.

For example, if the face is to be identified by two subunits A and B, the eye is to be identified by C and D, and the pupil by E and F, these subunits may be combined in various ways and the precision may be evaluated and the processing time detected in the manner described above, whereby an optimum solution for the combination of the identifying subunits to be employed can be determined automatically. In a further application of this approach, the stage of eye identification and detection may be skipped and only the stages from face identification and detection directly to pupil identification and detection are performed, or alternatively, the stage of face identification and detection is skipped and only the stages from eye identification and detection to pupil identification and detection are performed; in either case, the change in performance that results from the skip of a particular stage can be evaluated automatically.

It should be noted here that the result of such automatic evaluation using the group of tutorial images can vary with the group of tutorial images provided.

As already mentioned, the result of red-eye detection with the detection unit 12, namely, the mask 3 showing the red-eye region in the input image, is supplied to the position determining unit 14.

In the position determining unit 14, the red-eye region of the input image as detected by the detection unit 12 is transformed to position coordinates, which are outputted to a specified site, for example, a site that is provided at a subsequent stage to correct the red-eye. Note that transformation from the regional data to position coordinate values may be effected by any known method.

The operation of the processor 10 is described below. In one embodiment of the invention, there is provided a program that causes a computer or the like to execute the following processing.

To be specific, the program is an executable program that causes a computer to perform image processing of an input image for detecting a specified object of interest that is recorded in the input image. The program comprises the steps of causing an operating unit (CPU) in the computer to identify an object that satisfies a condition from within the input image, causing the CPU to detect a region of the identified object and storing it in a memory, repeating the step of the identification and the step of detection with the condition varied, thereby causing the CPU to identify and detect repeatedly such that a result of the detection in an earlier identification and detection step among the repeated identifications and detections is used to get the CPU to identify an object and detect a region of the object under different condition than have been used in the earlier identification and detection, and causing the CPU to detect a region of the object of interest within the input image on the basis of the regions of the repeatedly detected objects and causing the CPU to calculate the position coordinates of the object of interest in the input image from the detected region of the object of interest.

Figure 2:
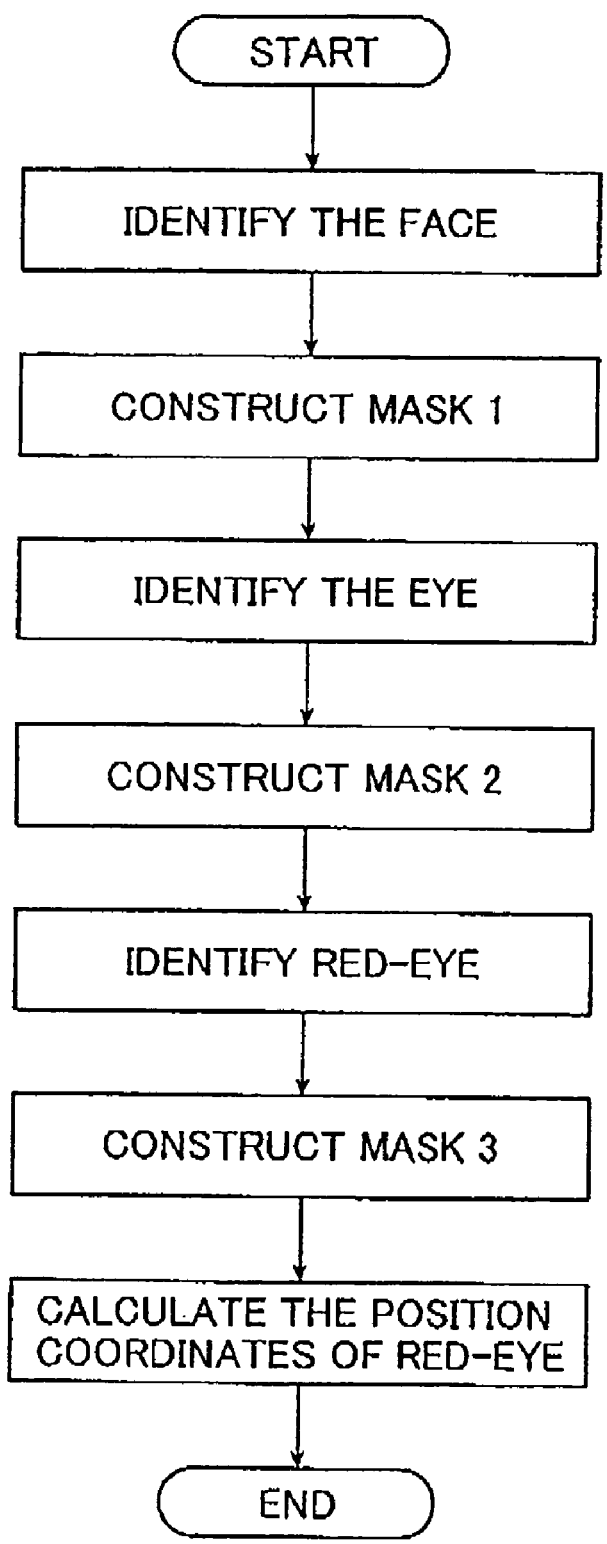
FIG. 2 is a flowchart showing the sequence of steps in one example of the image processing method and red-eye detection method of the invention.

FIG. 2 is a flowchart that shows an example of the image processing method and red-eye detection method of the present invention by illustrating an exemplary operation of the processor 10.

As already mentioned, the input image (input image data) sent to the processor 10 is supplied to the detection unit 12.

As shown in FIG. 2, the detection unit 12 supplied with the input image first identifies the face in the input image by means of the identifying subunit 1. Thereafter, the detection unit 12 constructs a mask 1 that represents the face region of the input image by "1" and the other region by "0". Then, using the mask 1, the identifying subunit 2 identifies the eye from the face region of the input image. Thereafter, the detection unit 12 constructs a mask 2 that represents the eye region of the input image by "1" and the other region by "0". Further, using the mask 2, the identifying subunit 3 identifies the red-eye from the eye region of the input image. Thereafter, the detection unit 12 constructs a mask 3 that represents the red-eye region of the input image by "1" and the other region by "0" and the mask 3 is supplied to the position determining unit 14 as the result of detecting the red-eye region from the input image.

Having received the mask 3, or the result of detecting the red-eye region, the position determining unit 14 performs coordinate transformation to calculate the position coordinates of the red-eye and supplies them to a subsequent stage, say, the red-eye correcting unit as described above.

In the above example, the process of red-eye detection from the input image starts with the step of detecting the face, then proceeds to the step of detecting the eye from the detected face region and ends with the step of detecting the red-eye from the eye region. Thus, in the foregoing example, the area to be processed is narrowed down in a sequence of stages until the red-eye which is the final object of interest can be detected.

Conversely, the red-eye detection method of the invention may start with the step of detecting the possible region (candidate region) for red-eye which can be regarded as red-eye, then performs face detection such that the possible region for red-eye in the face region may be detected as the red-eye region. Thus, the present invention provides a program that implements the execution of the following processing. The program is an executable program that causes a computer to perform red-eye detection such that an input image that records a human subject or an animal is processed for detecting an eye with the red-eye effect of the human subject or animal that is recorded in the input image. The program comprises the steps of causing an operating unit (CPU) in the computer to detect from the input image the possible region for red-eye that may have developed the red-eye effect, causing the CPU to detect the region of the face of the human subject or animal from the input image after detecting the possible region for red-eye, and causing the CPU to detect the region of the eye with the red-eye effect from the input image using the results of detecting the possible region for red-eye and the face region.

Figure 3:
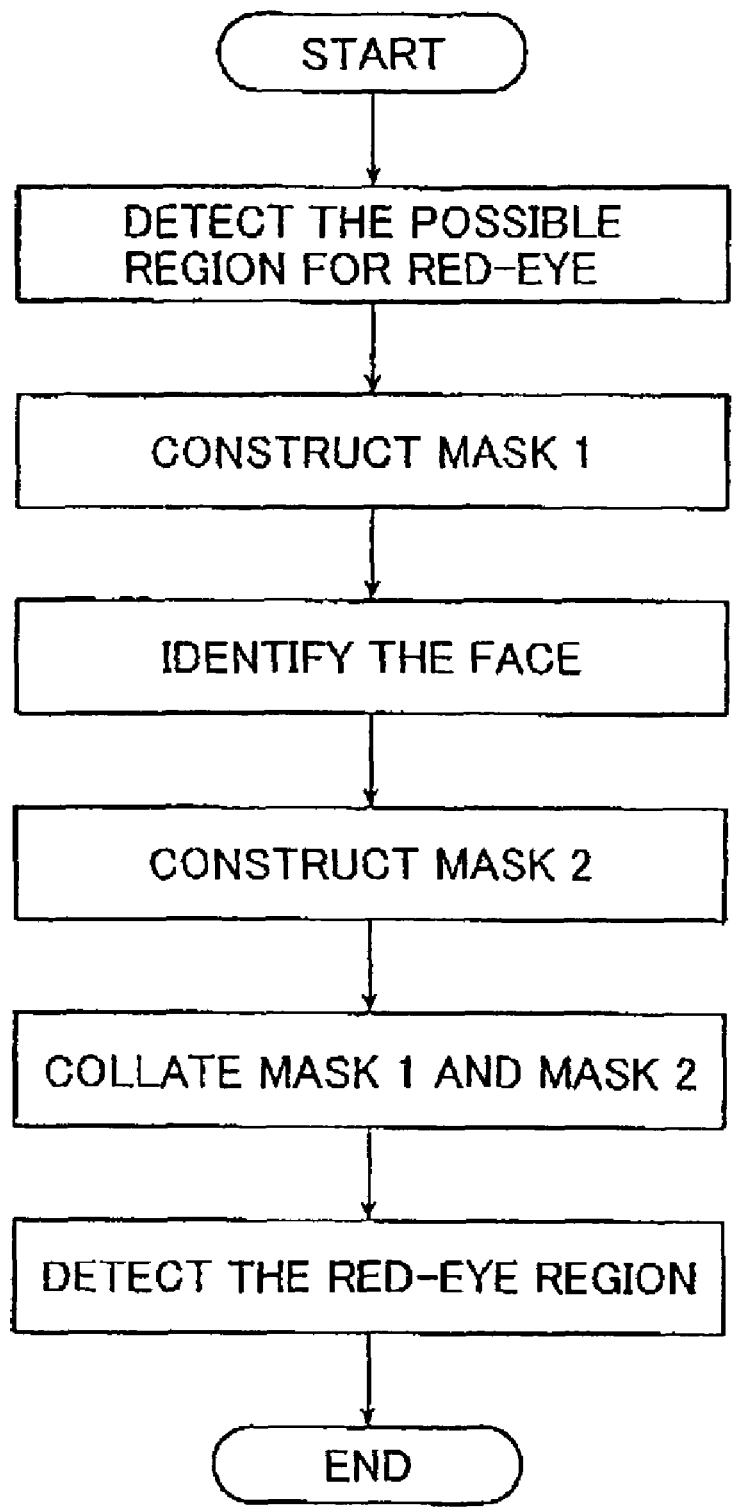
FIG. 3 is a flowchart showing the sequence of steps in another example of the image processing method and red-eye detection method of the invention.

Referring to the processor 10 shown in FIG. 1, a red-eye identifying subunit 1 and a face identifying subunit 2 are provided in the detection unit 12 and the program under consideration may be implemented according to the sequence shown in FIG. 3. When supplied with an input image, the detection unit 12 first identifies red-eye by means of the identifying subunit 1 and designating the identified and detected region as the possible region for red-eye, it constructs a mask 1 which shows the possible region for red-eye by "1" and the other region by "0". Subsequently, using the mask 1, the detection unit 12 identities and detects the face around the region of a possible region for red-eye by means of the identifying subunit 2 and constructs a mask 2 which shows the face region by "1" and the other region by "0". In the last step, the detection unit 12 collates the mask 1 and the mask 2 and detects the overlapping "1" region as the red-eye region.

As described above, the algorithm of red-eye detection shown in FIG. 3 starts with detecting the possible region for red-eye and then uses the result of detecting the possible region for red-eye to detect the face region. Compared with the algorithm shown in FIG. 2 in which the area to be processed is narrowed down through the stages of face identification and detection through eye identification and detection to red-eye identification and detection, the algorithm shown in FIG. 3 has the advantage of shortening the processing time to realize faster and more efficient processing.

Note that the red-eye detection method of the present invention is not necessarily limited to the case of using the image processing method and apparatus of the invention. For instance, the identifying subunit 2 may detect the face region without utilizing the mask 1 (which shows the result of detecting the possible region for red-eye) before final detection of the red-eye region is effected. Alternatively, the coordinates of the center position of the possible region for red-eye may be detected rather than the region itself and subsequent detection is performed for the face region and the red-eye region in that order.

Needless to say, the result of detecting the red-eye region in the red-eye detection method of the invention can be improved in reliability by detecting the regions of the aforementioned resemblances such as spectacles and the crow's foot. The detection of the regions of resemblances, if this is performed at all, may precede or follow the detection of the face region.

If the present invention is to be used in the ordinary case of detecting the region of a final object of interest, the region to be detected may be progressively narrowed down in the aforementioned manner; if it is to be used in detecting red-eye, a possible region for red-eye may first be detected, followed by the detection of the face.

While the image processing method and apparatus and the red-eye detection method of the invention, as well as the programs of the invention for executing that image-processing method and red-eye detection method have been described above in detail, the invention is by no means limited to the foregoing examples and it should be understood that various modifications and improvements can be made without departing from the spirit and scope of the invention.

For instance, in the illustrated cases, the face, eye and red-eye are detected but these are not the only objects that can be detected in the present invention and various other objects may be detected, including a human subject, his or her nose and mouth, animals such as a dog and a cat, and flowers. In other words, the present invention is advantageously applicable to various kinds of recognition-oriented image processing.

What is claimed is:

1. An image processing apparatus which processes an input image to detect a specified object of interest that is recorded in the input image, said apparatus comprising:
    a detection unit having a plurality of identifying subunits each of which identifies an object from the input image that satisfies a condition which is set differently each other, said detection unit detecting a region of the identified object; and
    a position determining unit which calculates the position coordinates of said object of interest in the input image from the region of the identified object,
    wherein said detection unit performs the identification and the detection repeatedly and, when the identification and the detection are repeated, said detection unit performs the identification and the detection under a different condition for identification than that used in previous identification of repeated identifications by using a detected region of an identified object in the previous identification, and said detection unit detects the specified object of interest using the repeatedly detected objects.

2. The image processing apparatus according to claim 1, wherein said detection unit has an identifying subunit that detects at least one resemblance to said object of interest, the resemblance is predetermined as not being said specified object of interest before being detected by the identifying subunit, and
    wherein a region of the detected resemblance is excluded from a region of said specified object of interest.

3. The image processing apparatus according to claim 2, wherein said input image is an image recorded with an image pickup device, said object of interest is an eye with a red-eye effect of a human subject, and the identifying subunit for detecting said resemblance as an object is at least one member of a group consisting of an identifying subunit which detects spectacles worn by the human subject as the resemblance, an identifying subunit which detects a crow's foot on a face of the human subject as the resemblance, an identifying subunit which detects an eyebrow on the face as the resemblance, and an identifying subunit which detects a pimple on the face as the resemblance.

4. The image processing apparatus according to claim 2, wherein the excluded region of the detected resemblance coincides with a portion of the region of said specified object of interest.

5. The image processing apparatus according to claim 1, wherein said input image is an image recorded with an image pickup device and said object of interest is an eye with the red-eye effect of a human subject or an animal.

6. The image processing apparatus according to claim 1, wherein the identification of an object by said detection unit is such that the region of the object detected is narrowed down as the identification is repeated.

7. The image processing apparatus according to claim 1, wherein said detection unit performs the identification and the detection under the different condition for identification than that used in the previous identification of the repeated identifications by using as inputs the input image and the detected region of the identified object in the previous identification.

8. An image processing method which processes an input image to detect a specified object of interest that is recorded on the input image, said method comprising the steps of:
    identifying an object from the input image that satisfies a condition;
    detecting a region of the identified object;
    repeating the step of identification and the step of detection a plurality of times with said condition being varied, thereby identifying and detecting an object each time under a different condition for identification than that used in previous identification of repeated identifications by using a detected region of an identified object in the previous identification; and
    detecting a region of the specified object of interest within said input image on a basis of repeatedly detected regions of the identified objects and calculating the position coordinates of said object of interest in the input image from the detected region of the object of interest.

9. The image processing method according to claim 8, wherein the identification and the detection under the different condition for identification than that used in the previous identification of the repeated identifications is performed by using as inputs the input image and the detected region of the identified object in the previous identification.

10. A red-eye detection method by which an input image that records a human subject or an animal is processed for detecting an eye with a red-eye effect of the human subject or the animal that is recorded in the input image, said method comprising the steps of:
    detecting from the input image a possible region for red-eye that may have developed the red-eye effect;
    detecting a region of a face of the human subject or the animal around the possible region for red-eye from said input image after detecting the possible region for red-eye; and
    detecting a region of the eye with the red-eye effect from the input image by collating a result of the detecting the possible region for red-eye and a result of the detecting the region of the face.

11. The red-eye detection method according to claim 10, wherein at least one object selected from a group consisting of spectacles worn by a human subject, a crow's foot on the human subject's face, an eyebrow on the human subject's face and a pimple on the human subject's face is detected from said input image and the region of the eye with the red-eye effect is detected from said input image using the result of detection of at least one member of the group.

12. A computer readable recording medium having recorded thereon a program for executing an image processing method which processes an input image to detect a specified object of interest that is recorded on the input image, the method comprising the steps of:

identifying an object that satisfies a condition from within the input image;

detecting a region of the identified object and storing it in a memory;

repeating the step of the identification and the step of the detection with said condition being varied, thereby identifying and detecting an object each time under a different condition for identification than that used in previous identification of repeated identifications by using a detected region of an identified object in the previous identification; and detecting a region of the object of interest within said input image on a basis of repeatedly detected regions of the identified objects and calculating position coordinates of said object of interest in the input image from the detected region of the object of interest.

13. A computer readable recording medium having recorded thereon a program for executing a red-eye detection method by which an input image that records a human subject or an animal is processed for detecting an eye with a red-eye effect of the human subject or the animal that is recorded in the input image, said method comprising the steps of:

detecting from the input image a possible region for red-eye that may have developed the red-eye effect;

detecting a region of a face of the human subject or the animal around the possible region for red-eye from the input image after detecting the possible region for red-eye; and detecting a region of the eye with the red-eye effect from the input image by collating a result of the detecting the possible region for red-eye and a result of the detecting the region of the face.

14. The computer readable recording medium according to claim 13, wherein said step further comprises at least one step selected from a group consisting of the step detecting spectacles worn by the human subject from the input image as an object, the step of detecting a crow's foot on the human subject's face from the input image as an object, the step of detecting an eyebrow on the human subject's face from the input image as an object, and the step of detecting a pimple on the human subject's face from the input image as an object, and wherein the step by which the region of the eye with the red-eye effect is detected from the input image comprises detecting the region of said eye with the red-eye effect using a result of at least one detecting step of the group which is followed by the step detecting the region of said eye with the red-eye effect.

* * * * *